US008381246B2

(12) United States Patent  (10) Patent No.: US 8,381,246 B2
Skog et al.  (45) Date of Patent: Feb. 19, 2013

(54) METHODS AND APPARATUS FOR PROVIDING ELECTRONIC PROGRAM GUIDES

(75) Inventors: Robert Skog, Hasselby (SE); Curt Collinsworth, Helsinki (FI); Justus Petersson, Hasselby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 141 days.

(21) Appl. No.: 12/973,569

(22) Filed: Dec. 20, 2010

(65) Prior Publication Data

US 2012/0054797 A1  Mar. 1, 2012

Related U.S. Application Data

(60) Provisional application No. 61/377,726, filed on Aug. 27, 2010.

(51) Int. Cl.
*H04N 5/445* (2011.01)
(52) U.S. Cl. .............................. 725/41; 725/40; 709/219
(58) Field of Classification Search .............. 725/37–61; 709/217–232
See application file for complete search history.

(56) References Cited

U.S. PATENT DOCUMENTS

| 5,737,029 | A | * | 4/1998 | Ohkura et al. | ................. | 348/569 |
| 5,907,323 | A | * | 5/1999 | Lawler et al. | .................... | 725/41 |
| 5,974,218 | A | * | 10/1999 | Nagasaka et al. | ............. | 386/200 |
| 6,295,646 | B1 | * | 9/2001 | Goldschmidt Iki et al. | .... | 725/41 |
| 6,870,573 | B2 | * | 3/2005 | Yeo et al. | ....................... | 348/569 |
| 2002/0166122 | A1 | | 11/2002 | Kikinis et al. | | |
| 2003/0014752 | A1 | | 1/2003 | Zaslavsky et al. | | |
| 2004/0128317 | A1 | | 7/2004 | Sull et al. | | |
| 2007/0107015 | A1 | | 5/2007 | Kazama et al. | | |

FOREIGN PATENT DOCUMENTS

| EP | 1821529 A2 | 8/2007 |
| EP | 2259576 A1 | 12/2010 |
| WO | WO 2010/002921 A1 | 1/2010 |

OTHER PUBLICATIONS

International Search Report, PCT/SE2010/051454, Oct. 31, 2011.
Written Opinion of the International Searching Authority, PCT/SE2010/051454, Oct. 28, 2011.

* cited by examiner

*Primary Examiner* — Annan Shang
(74) *Attorney, Agent, or Firm* — Myers Bigel Sibley & Sajovec, P.A.

(57) ABSTRACT

A method of generating on a display device an electronic program guide for broadcast channels. Electronic program guide information for a plurality of broadcast channels is received at an electronic terminal from a broadcast media server. The electronic program guide information includes live video streams and/or snapshot pictures from programs that are presently being broadcast on a plurality of broadcast channels. A graphical arrangement of a plurality of objects is generated on the display device. Each of the objects is associated with a different one of the broadcast channels. The live video stream and/or the snapshot picture from the program that is presently being broadcast on the associated broadcast channel is displayed on a defined surface of each of the associated objects. A three-dimensional graphical arrangement may be generated from the objects. Each of the objects may extend with a respective virtual depth into the display device that is controlled to indicate to a user how much time remains in the program that is presently being broadcast on the associated broadcast channel. Related electronic terminals and media servers are disclosed.

16 Claims, 11 Drawing Sheets

METHODS AND APPARATUS FOR PROVIDING ELECTRONIC PROGRAM GUIDES

RELATED APPLICATIONS

The present application claims the benefit of priority from U.S. Provisional Application No. 61/377,726 entitled "Methods and Apparatus for Providing Electronic Program Guides" filed Aug. 27, 2010, the disclosure of which is hereby incorporated herein in its entirety by reference.

BACKGROUND

Electronic Program Guides (EPG) provide users of television, radio, and other media applications with continuously updated menus displaying scheduling information for current and upcoming programming.

Non-interactive electronic program guides are typically available for television and radio, and can be provided on a dedicated channel as a digitally-displayed non-interactive menu of program scheduling information from a cable or satellite television provider to its viewers. EPGs are broadcast by specialized video generation equipment housed within each provider's central television distribution facility. By tuning a receiver to a dedicated EPG channel, a menu is displayed that lists current and upcoming programs on all available channels.

A more modern form of the EPG, associated with both television and radio broadcasting, is the interactive (electronic) program guide. An interactive EPG allows television viewers and radio listeners to navigate scheduling information menus interactively, selecting and discovering programming by time, title, channel, or genre using an input device such as a keypad, computer keyboard, or television remote control. Its interactive menus are generated entirely within local broadcast signal receiver or display equipment using raw scheduling data sent by individual broadcast stations or centralized scheduling information providers. FIG. 1 is a screen shot of an example conventional interactive EPG that can be displayed on a television.

Some television remote controls include a touch screen interface, which is an electronic visual display device that can detect the presence and location of a touch selection within the display area. Touch screen interfaces are generally configured to receive touch input via a user's finger or hand, although they can be configured to sense other objects, such as a stylus. Some display interfaces can sense objects that are adjacent to, but not touching the interface, such as by sensing light from a light pen and/or sensing light that is reflected off of an adjacent object that is being manipulated by a user.

Because of the increasing number of channels provided by broadcast providers, viewers sometimes must page through a large number of pages of programming information provided by interactive EPGs to discover a particular program or a possibly interesting program. Although touch screen interfaces and other advances for remote controls may enable easier paging through interactive EPG programming information pages, accessing programming information in this manner may not be considered an adequate solution by many viewers.

SUMMARY

Some embodiments of the present invention are directed to a method of generating on a display device an electronic program guide for broadcast channels. Electronic program guide information for a plurality of broadcast channels is received at an electronic terminal from a broadcast media server. The electronic program guide information includes live video streams and/or snapshot pictures from programs that are presently being broadcast on a plurality of broadcast channels. A graphical arrangement of a plurality of objects is generated on the display device. Each of the objects is associated with a different one of the broadcast channels. The live video stream and/or the snapshot picture from the program that is presently being broadcast on the associated broadcast channel is displayed on a defined surface of each of the associated objects.

In some further embodiments, a channel selection command is communicated from the electronic terminal to a separate television that commands the television to tune to the broadcast channel associated with the selected object. A three-dimensional graphical arrangement may be generated from the objects, with each of the objects being viewable by a user and extending with a respective virtual depth into the display device that is controlled to indicate to a user how much time remains in the program that is presently being broadcast on the associated broadcast channel.

Some other embodiments of the present invention are directed to an electronic terminal that generates an electronic program guide for broadcast channels. The electronic terminal includes at least one communication interface that receives from a broadcast media server electronic program guide information for a plurality of broadcast channels. The electronic program guide information includes live video streams and/or snapshot pictures from programs that are presently being broadcast on a plurality of broadcast channels. The electronic terminal further includes a display device and a processor circuit. The processor circuit is configured to generate a graphical arrangement on the display device of a plurality of objects. Each of the objects is associated with a different one of the broadcast channels. The processor circuit is further configured to display on a defined surface of each of the objects the live video stream and/or the snapshot picture from the program that is presently being broadcast on the associated broadcast channel.

Some other embodiments of the present invention are directed to a media server that communicates electronic program guide information to an electronic terminal. The media server includes at least one communication interface and a processor circuit. The processor circuit is configured to determine a schedule of programs that are presently being broadcast over a plurality of broadcast channels and that will be broadcast over a defined period of time. The processor circuit is further configured to generate electronic program guide information that includes a live video stream and/or a snapshot picture from each of a plurality of the programs that are presently being broadcast on the broadcast channels. The live video stream is generated having a reduced frame size and/or the snapshot picture is generated having a reduced resolution relative to the programs. The electronic program guide information also includes the determined schedule of programs. The processor circuit communicates the electronic program guide information through the communication interface to the electronic terminal.

Other methods, electronic terminals, media servers, and/or systems according to embodiments of the invention will be or become apparent to one with skill in the art upon review of the following drawings and detailed description. It is intended that all such additional methods, electronic terminals, media servers, and/or systems be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the present invention and are incorporated in and constitute a part of this application, illustrate certain embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein.

Various embodiments of the present invention are directed to configuring electronic terminals to provide enhanced EPG functionality. Although various embodiments are described in the context of providing an interactive EPG that shows broadcast programs/channels, such as television programs, the invention is not limited thereto. Instead, other embodiments of the invention include providing an EPG that shows video, audio, multimedia, and other types of media that can be broadcast or streamed on-demand (e.g., Internet streaming video) to an electronic terminal.

As used herein, an electronic terminal can include, but is not limited to, a remote control, a television, a television tuner (e.g., cable/satellite tuner) that is separate from a television/display device, a cellular communication terminal, and/or a desktop/laptop/palmtop computer that can generate an EPG for display on a display device of the electronic terminal and/or for display on a separate display device.

In accordance with some embodiments, an electronic terminal can include a touch display device, such as a multi-touch display device that can detect the presence and location of a plurality of time-overlapping touch points on/adjacent to the display device. The electronic terminal is configured to generate an EPG that is displayed by the display device. The electronic terminal can be configured to generate an EPG that includes an arrangement of video/picture thumbnails that provide a virtual three-dimensional view of a plurality of different channels (e.g., different terrestrial/cable/satellite broadcast stations, etc.).

Figure 1:
FIG. 1 is a screen shot of an example conventional interactive EPG that can be displayed by a television.
Figure 2:
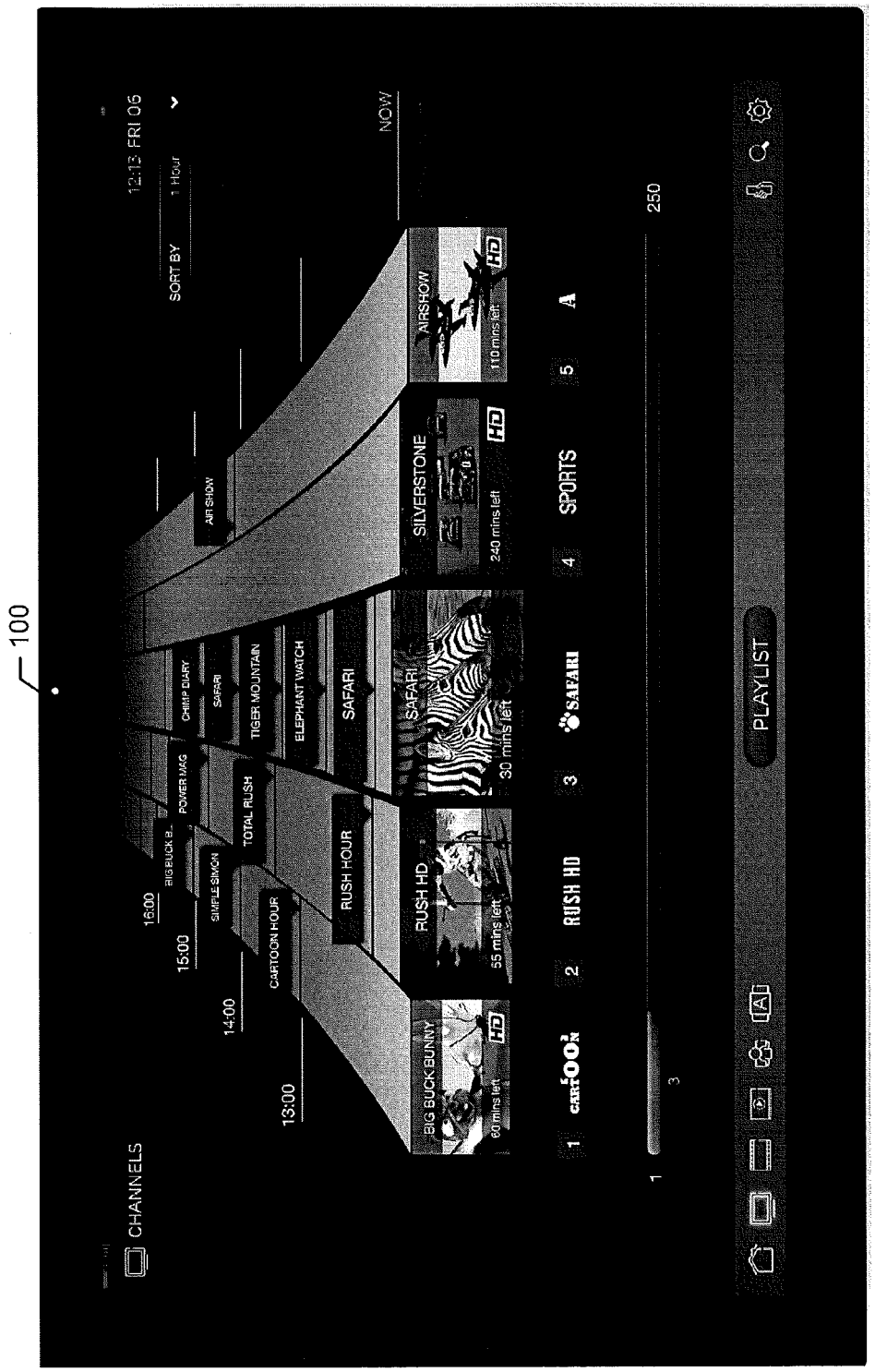
FIG. 2 is a snapshot of an example EPG that is displayed by an electronic terminal according to some embodiments of the present invention.

FIG. 2 is a snapshot of some embodiments of an EPG that is displayed by an electronic terminal on a display device 100. Embodiments of the invention are not limited to the particular configuration of this example EPG. Referring to FIG. 2, the electronic terminal is configured to generate an EPG that graphically displays a plurality of video/picture thumbnails that are arranged horizontally and indicate what television programs are presently being broadcast on a plurality of different channels. The EPG also graphically displays in a virtual three-dimensional depth a forward looking timeline and an indication of how much time remains in each of the television programs relative to the timeline.

By way of example, FIG. 2 simultaneously displays a program guide showing five different channels and displays five video thumbnails each containing live video of what is presently being broadcast on a corresponding one of the five channels. Channel 1 is indicated to be a "cartoon" category channel and the live video that is displayed in the corresponding thumbnail shows that a cartoon is presently being broadcast. The electronic terminal further generates a text overlay on the video thumbnail for channel 1 that indicates that the cartoon is a "Big Buck Bunny" program and generates another text overlay on the video thumbnail that indicates that 60 minutes of that program remain to be seen. Similarly, Channel 2 is indicated to be a "Rush HD" category channel and the live video that is displayed in the corresponding thumbnail has text overlays indicating that a "Rush HD" program is presently being broadcast and that 55 minutes of that program remain to be seen. Channel 3 is indicated to be a "Safari" category channel and the live video that is displayed in the corresponding thumbnail has text overlays indicating that a "Safari" program is presently being broadcast and that 30 minutes of that program remain to be seen. Channel 4 is indicated to be a "Sports" category channel and the live video that is displayed in the corresponding thumbnail has text overlays indicating that a "Silverstone" program is presently being broadcast and that 240 minutes of that program remain to be seen. Channel 5 is indicated to be an "A" category channel and the live video that is displayed in the corresponding thumbnail has text overlays indicating that an "Airshow" program is presently being broadcast and that 30 minutes of that program remain to be seen.

Although text overlays are shown on the video thumbnails of FIG. 2, the text may additionally or alternatively be displayed partially overlapping or adjacent to the video thumbnails.

Each of the video thumbnails for the five channels has a virtual three-dimensional shape (e.g., a rectangular curved pipe shape) that extends in a direction into the display device along the displayed timeline, and each of the three-dimensional shapes has a graphical length extending into the display device that indicates how much time remains in the corresponding broadcasted programs. For example, the video thumbnail for channel 1 in on a three-dimensional shape that extends to 13:00. A textual overlay is positioned at 13:00 and indicates that another program "Cartoon Hour" will begin playing, and another three-dimensional shape extends therefrom to 14:00 to indicate the duration of that program. Another textual overlay is positioned at 14:00 and indicates that another program "Simple Simon" will begin playing, and another three-dimensional shape extends therefrom to 15:00 to indicate the duration of that program. Another textual overlay is positioned at 15:00 and indicates that another program "Big Buck B . . . " will begin playing, and another three-dimensional shape extends therefrom to 16:00 to indicate the duration of that program. Each of the three-dimensional program shapes associated with channel 1 are serially aligned one after another to create a virtual stacked pipe in this example embodiment.

Accordingly, the user can view the three-dimensional program guide that is shown in FIG. 2 to see live video from the programs being presently broadcast on each of the five channels. The user can also visually observe from the three-dimensional length of the three-dimensional pipe shapes associated with each program how much time remains in the corresponding presently broadcast programs and can visually observe the duration of each of the upcoming broadcast programs. The user can further visually observe from the displayed timeline and the text overlays associated with each program pipes what sequence of programs can be seen in the future on each of the channels and at what time each program will start and how long it will play.

A user may select one of the thumbnails or the associated three-dimensional object to cause an associated computer in the electronic terminal to communicate a channel selection command to a separate television that commands the television to tune to the broadcast channel associated with the selected thumbnail. The user may thereby operate the electronic device as a remote control and select among the displayed thumbnails and/or three-dimensional object in the displayed EPG to control channel tuning by an associated television. Alternatively or additionally, the computer may respond to user selection of one of the thumbnails by displaying the program associated with the selected thumbnail in a larger window on the display 100. Alternatively or additionally, the user may select among the presently broadcast programs or future broadcast programs shown in the EPG to control recording of the selected program by a digital video recorder or other recorder device that is separate from or contained within the electronic terminal.

In some embodiments, a user may see what programs will play at more remote times by scrolling along the illustrated timeline (e.g., by swiping a finger along the display or manipulating another user interface) to cause later and earlier programs to be displayed in the EPG relative to a corresponding forward advanced timeline or reverse advanced timeline, and to cause display in the EPG of corresponding textual descriptions. The displayed thumbnails for the channels may change as the user progresses forward in time to show a static freeze frame image and/or reduced frame rate video from the corresponding programs that will be played at that time and/or show program name, program logo, or other indicia that visually indicates what programs will play at various points along the timeline.

Although the example program guide of FIG. 2 shows five channels for ease of illustration and explanation, the invention is not limited thereto. Moreover, in some other embodiments the thumbnails associated with each channel may show a static freeze frame image or a reduced frame rate video feed from the program that is presently playing on the corresponding channel. The user may select one or more of the thumbnails to transition between showing the static freeze frame image/reduced frame rate video and showing a live full frame rate video feed. Thus, for example, a user may touch or otherwise activate the thumbnail of channel 1 to transition from it displaying a static freeze frame image/reduced frame rate video of the "Big Buck Bunny" program to displaying a live full frame rate video feed of that program or vice-versa. Similarly, the user may touch or otherwise activate the thumbnail of channel 5 to transition from it displaying a static freeze frame image/reduced frame rate video of the "Airshow" program to displaying a live video full frame rate video feed of that program or vice-versa. Moreover, the user may use time overlapping touches (e.g., multi-touch) to select two or more of the thumbnails to cause the selected thumbnails to transition from displaying a static frame image/reduced frame rate video of the presently playing program of the associated channels to instead displaying a live full frame rate video feed of those program or vice-versa.

Figure 3:
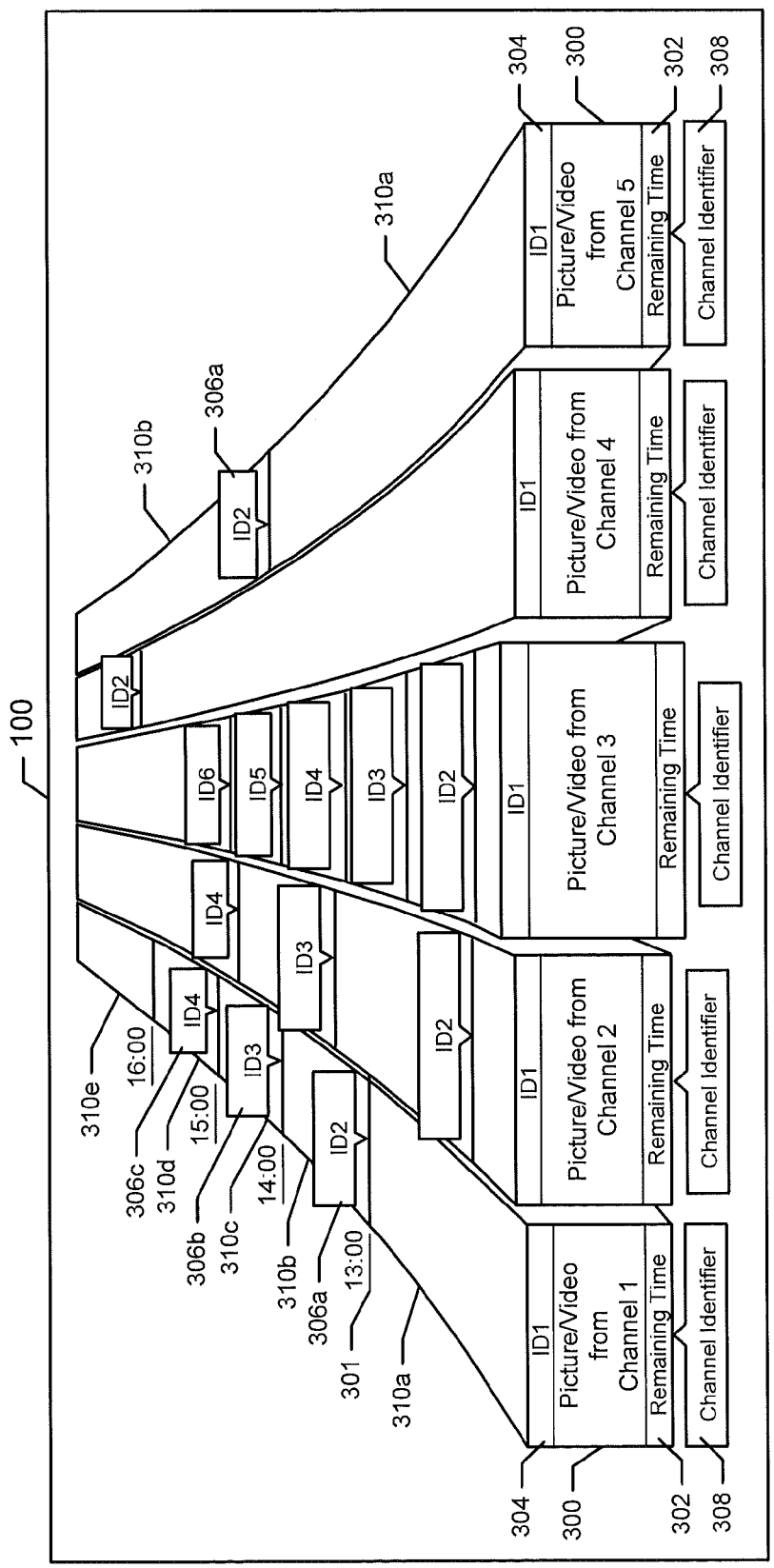
FIG. 3 illustrates another example EPG that is displayed by an electronic terminal according to some embodiments of the present invention.

FIG. 3 is a snapshot of some other embodiments of an EPG that is displayed by an electronic terminal on the display device 100. Embodiments of the invention are not limited to the particular configuration of this example EPG. The EPG of FIG. 3 includes a EPG configuration similar to that shown in FIG. 2, but some differences include the type of information that is displayed relative to programs that are presently being broadcast. Referring to FIG. 3, a plurality of still-pictures (e.g., video snapshots or graphical indication) or video thumbnails 300 are arranged horizontally and indicate what television programs are presently being broadcast on a plurality of different corresponding channels. In a configuration similar to that described above for FIG. 2, the EPG also graphically displays a forward looking timeline 301 and three-dimensional objects 310, which configured to appear to have a three-dimensional depth into the display 100, that indicate the start and stop times of corresponding programs relative to each other and the displayed timeline.

The electronic terminal may further generate program identifier overlays "ID1" 304 on the thumbnails 300 that identify the underneath program by its name and/or by a graphical identifier for the program. Other overlays 302 that may be displayed on each of the thumbnails 300 may indicate a remaining duration of the respective program and/or may provide a name and/or graphical identifier for the associated channel. Alternatively or additionally, other identifiers 308 (text/graphical identifier) may be displayed adjacent to each of the thumbnails 300 that identifies the associated channel, the associated program, and/or the remaining duration of the respective program.

Each of the thumbnails 300 has a virtual three-dimensional shape (e.g., a rectangular curved pipe shape) 310a that extends in a direction into the display device 100 along the displayed timeline, and each of the three-dimensional shapes has a graphical length extending into the display device that indicates how much time remains in the corresponding broadcasted programs. Additional shapes 310b,c,d, etc. are aligned with one another extending into the display 100 and are each associated with different programs that are scheduled to begin in the future. Program identifiers 306 are displayed adjacent to each of the shapes to identify the associated program by name and/or by a representative graphical identifier. Alternatively or additionally, the program identifiers 306 may identify the program start time and/or duration of the program.

Accordingly, the user can view the three-dimensional EPG that is shown in FIG. 3 to see still-pictures and/or live video from the presently broadcasted programs and/or to see a text or graphical identifier for each of the presently broadcasted programs. The user can also visually observe from the three-dimensional length (depth) of the three-dimensional pipe shapes 310 associated with each program how much time remains in the associated program and can visually observe the duration of each of the upcoming broadcast programs. The user can further visually observe from the displayed timeline and the identifiers 306 associated with each program pipes what sequence of programs can be seen in the future on each of the channels and at what time each program will start and how long it will play.

A user may select one of the thumbnails 300 or the associated three-dimensional object 310 to cause an associated computer in the terminal to communicate a channel selection command to a separate television that commands the television to tune to the broadcast channel associated with the selected thumbnail 300. The user may thereby operate the electronic device as a remote control and select among the displayed thumbnails 300 and/or three-dimensional object 310 in the displayed EPG to control channel tuning by an associated television. Alternatively or additionally, the computer may respond to user selection of one of the thumbnails 300 by displaying the broadcast channel associated with the selected thumbnail 300 on the display 100, such as in a larger window on the display 100 of the electronic terminal.

A user may select one of the objects 310 associated with an upcoming program (e.g., object 310b) to cause the computer to display information that describes that program (e.g., description of program ID2). Alternatively or additionally, the computer may respond to a user selection of the object 310 (e.g., object 310b) by communicating commands to a digital video recorder device or other recording device to cause that device to record the program (e.g., program ID2) associated with the selected object 310 (e.g., object 310b). The digital video recorder device or other recording device may reside at least in part within the electronic device (e.g., recording designated programs to an internal mass memory) or may be a separate device such as a digital video recorder device that is part of a satellite/cable/terrestrial tuner connected to a television. A user may thereby select among the displayed objects 310 (e.g., objects 310a-e associated with channel 1, objects 310a-b associated with channel 5, etc.) displayed in the EPG to learn more details about the associated programs and/or to control recording of selected programs.

Figure 4:
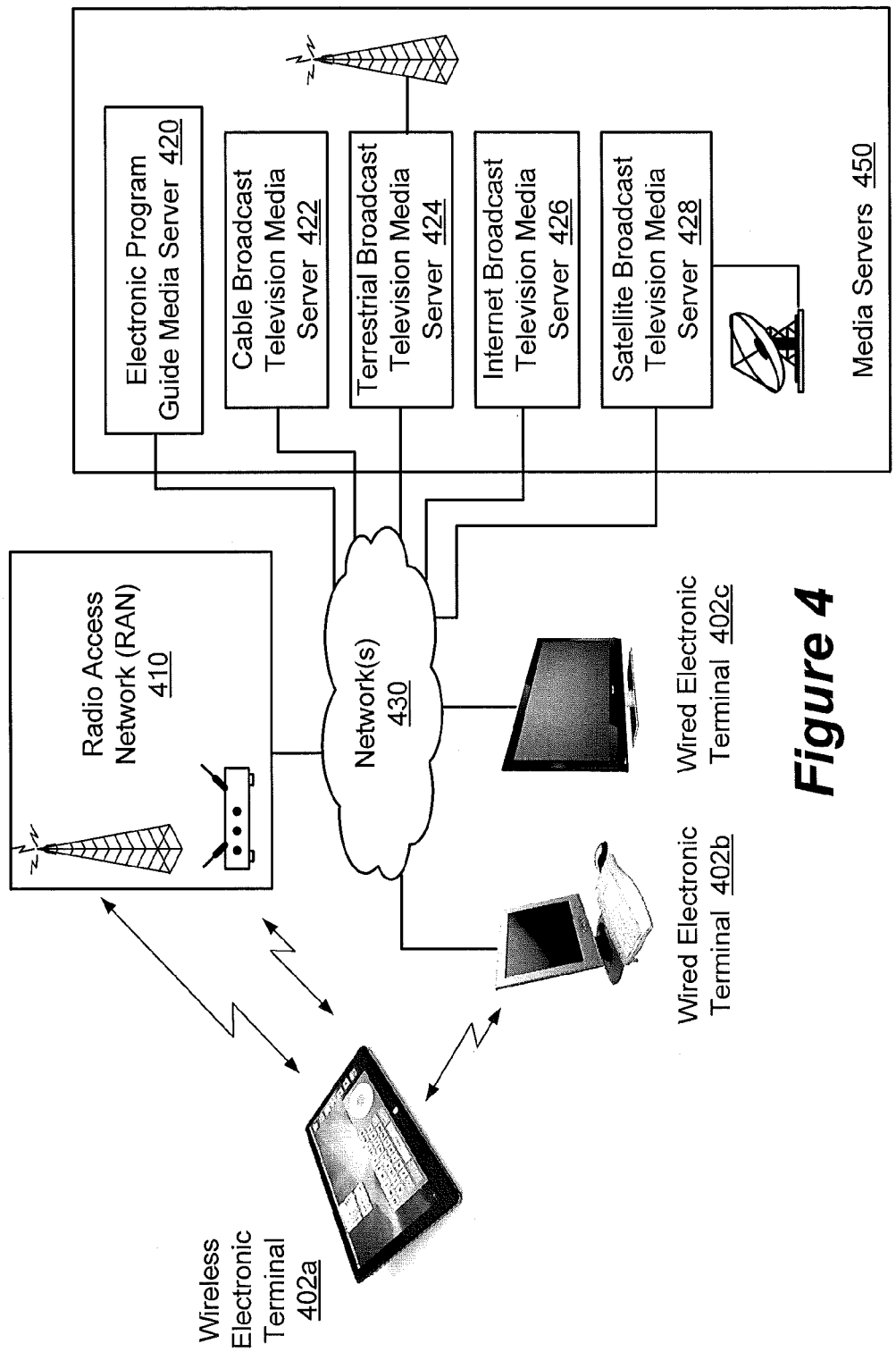
FIG. 4 is a block diagram of a system that includes a plurality of electronic terminals, a radio access network, and media servers that are configured according to some embodiments of the present invention.

FIG. 4 is block diagram of a system that includes a plurality of electronic terminals 402a-c, a radio access network (RAN) 410, and a plurality of media servers 450 that are configured according to some embodiments of the present invention. The RAN 410 and the media servers 450 may correspond to a terrestrial wireless broadcast television service and/or a satellite broadcast television service that streams television programs or other media through one or more networks 430 (e.g., public/private broadband data network(s)) to the electronic terminals 402a-c. Alternatively, the media servers 450 may correspond to a cable television service and/or Internet media service that streams television programs or other media through one or more networks 430 to the electronic terminals 402a-c. For example, the media servers 450 may include a cable broadcast television media server 422, a terrestrial broadcast television media server 424, an Internet broadcast television media server 426, and/or a satellite broadcast television media server 428.

Each of the media servers 422, 424, 426, 428 may include a server that communicates EPG information to the electronic terminals 402a-c for use by the electronic terminals 402a-c to generate EPGs on their respective display devices and/or on another display device that is communicatively connected thereto. Alternatively or additionally, some or all of the media servers 422, 424, 426, 428 may communicate information to a separate electronic program guide media server 420 for use by the electronic program guide media server 420 to generate EPG information that it communicates to the electronic terminals 402a-c. The separate electronic program guide media server 420 may combine information received from two or more of the media servers 422, 424, 426, 428 to generate EPG information that allows the electronic terminals 402a-c to generate EPGs that illustrate a schedule of programs from each of the associated media servers 422, 424, 426, 428.

The wireless electronic terminal 402a is configured to communicate with the media servers 450 through the radio access network (RAN) 410. The RAN 410 may contain one or more cellular radio access technology systems that may include, but are not limited to, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), and/or 3GPP LTE ($3^{rd}$ Generation Partnership Project Long Term Evolution). The RAN 410 may alternatively or additional communicate with the terminal 402a through a Wireless Local Area Network (i.e., IEEE 802.11) interface, a Bluetooth interface, and/or other RF interface.

The wired electronic terminals 402b-c may include, but are not limited to, a desktop/laptop/palmtop computer, a television, and/or broadcast television tuner (e.g., cable/satellite tuner) that may be configured to communicate with the media servers 420 through a wired connection (e.g., cable/digital subscriber line/etc.) to the network 430. One of the electronic terminals 402 may be configured to function as a remote control that can be operated by a user to control channel tuning by a separate broadcast tuner device (e.g., satellite/cable/terrestrial tuner) associated with a television and/or to control recording of broadcast programs by a digital video recorder device or other recorder device.

FIGS. 5-15 are flowcharts of example operations and methods that may be carried out by each of the electronic terminals 402 in combination with the media servers 450 of FIG. 4 to generate EPGs on display devices. These EPGs may include, but are not limited to, the example EPGs shown in FIGS. 2 and 3.

Figure 5:
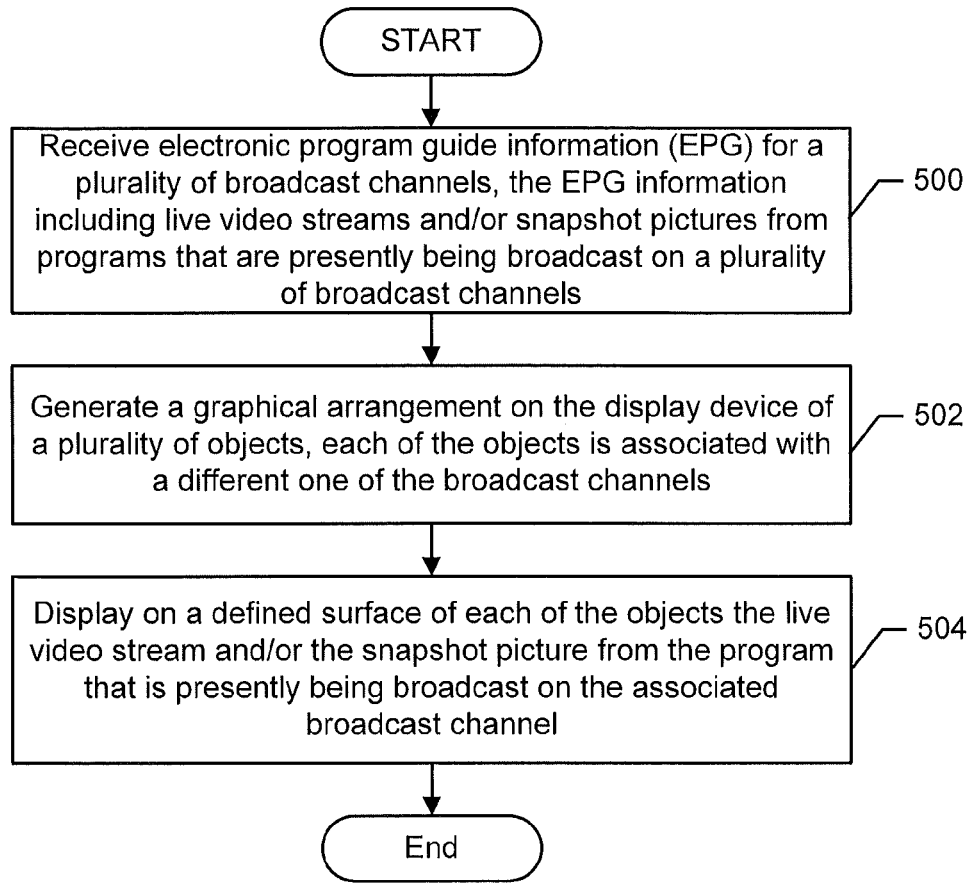
FIGS. 5-15 are flowcharts of example operations and methods that may be carried out by the electronic terminal in combination with one or more of the media servers of FIG. 4 to generate electronic program guides according to some embodiments of the present invention.

FIG. 5 illustrates operations and methods that can be performed by a computer in an electronic terminal 402 to generate on a display device an EPG for broadcast channels. EPG information for a plurality of broadcast channels is received (block 500) from a broadcast media server 450. The EPG information includes live video streams and/or snapshot pictures (e.g., pictures/videos 300 of FIG. 3) from programs that are presently being broadcast on a plurality of broadcast channels along with schedule information for upcoming programs that will be broadcast on the broadcast channels. A graphical arrangement of a plurality of objects (e.g., three-dimensional objects 310 of FIG. 3) is generated (block 502) on the display device. Each of the objects is associated with a different one of the broadcast channels. The live video stream and/or the snapshot picture from the program that is presently being broadcast on the associated broadcast channel is displayed (block 504) on a defined surface of each of the objects.

Figure 6:
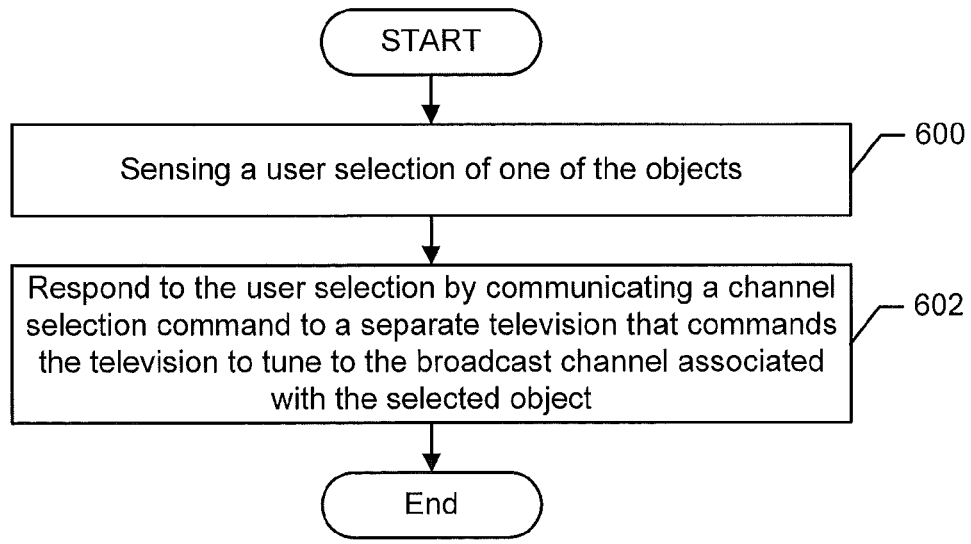

FIG. 6 illustrates further operations and methods that can be performed by the computer in the electronic terminal 402. Referring to FIG. 6, a user selection of one of the objects (e.g., picture/video 300 and/or associated three-dimensional object 310 of FIG. 3) is sensed (block 600), such as by a user touch selection on the display and/or operation of another user interface. The computer responds to the user selection by communicating (block 602) a channel selection command to a separate television that commands the television to tune to the broadcast channel associated with the selected object.

Figure 7:
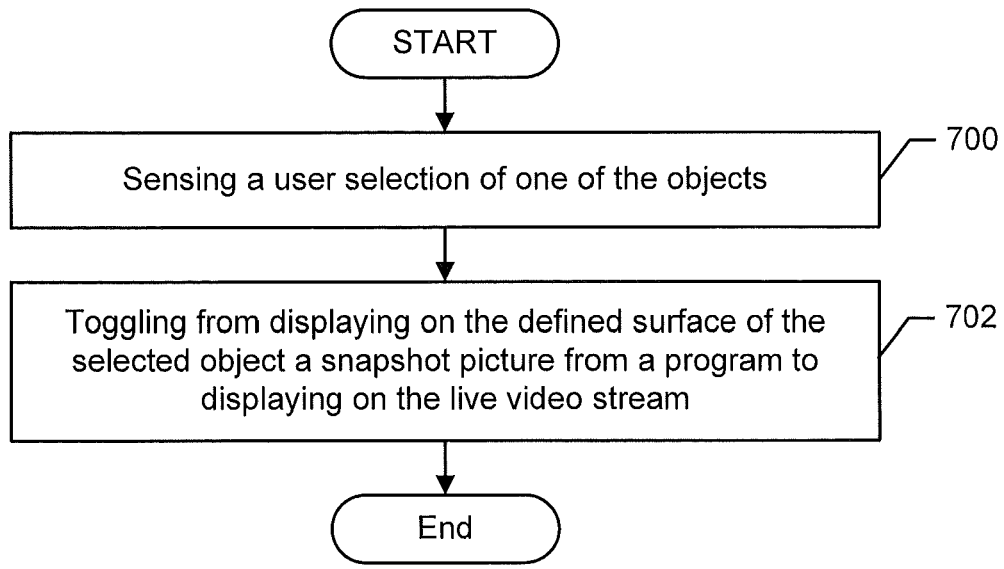

FIG. 7 illustrates further operations and methods that can be performed by the computer in the electronic terminal 402. Referring to FIG. 7, a user selection of one of the objects (e.g., picture/video 300 and/or associated three-dimensional object 310a of FIG. 3) is sensed (block 700). The computer responds to the user selection by toggling (block 702) from displaying on the defined surface of the selected object a snapshot picture from a program that is presently being broadcast on the associated broadcast channel to displaying on the defined surface of the selected object the live video stream from the program that is presently being broadcast on the associated broadcast channel.

Figure 8:
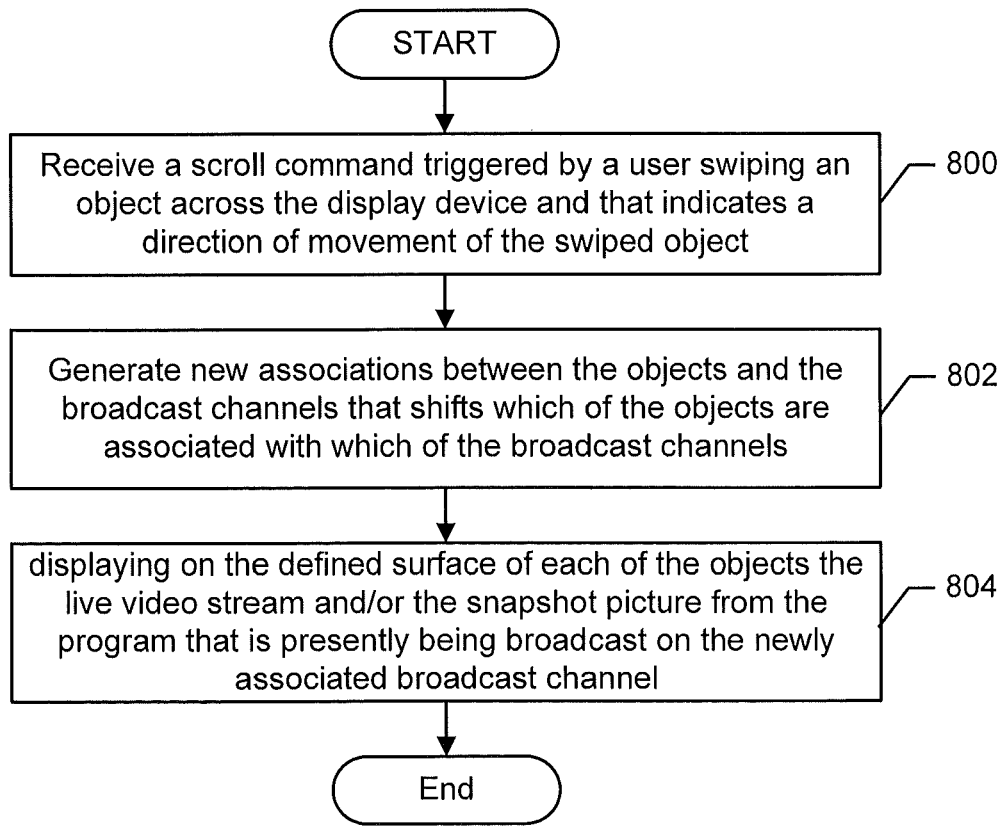

FIG. 8 illustrates further operations and methods that can be performed by the computer in the electronic terminal 402. The computer receives (block 800) a scroll command that is triggered by a user swiping an object across the display device 100 and that indicates a direction of movement of the swiped object. The computer generates new associations between the objects (e.g., three-dimensional objects 310 of FIG. 3) and the broadcast channels that shift, in a direction determined responsive to the scroll command and the indicated direction of movement of the swiped object, which of the objects are associated with which of the broadcast channels. The computer then displays on the defined surface of each of the objects the live video stream and/or the snapshot picture from the program that is presently being broadcast on the newly associated broadcast channel. Thus, for example, a user may swipe a finger across the display 100 of FIG. 3 to cause the computer to shift the displayed programs left or right across the screen, so that one or more channels that follow channel 5 or that precede channel 1 slide onto the display 100 to be displayed to a user on the EPG with program identifiers, start/end timeline indicators, and other information being displayed for those newly displayed programs.

Figure 9:
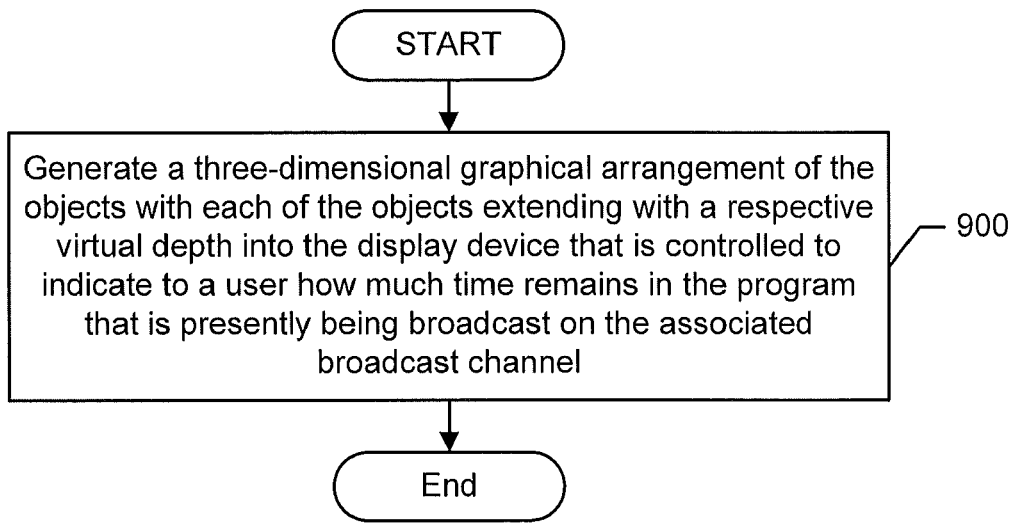

FIG. 9 illustrates further operations and methods that can be performed by the computer in the electronic terminal 402. Referring to FIG. 9, the computer generates (block 900) a three-dimensional graphical arrangement of the objects (e.g., three-dimensional objects 310 of FIG. 3) with each of the objects being viewable by a user and extending with a respective virtual depth into the display device 100 that is controlled to indicate to a user how much time remains in the program that is presently being broadcast on the associated broadcast channel.

Figure 10:
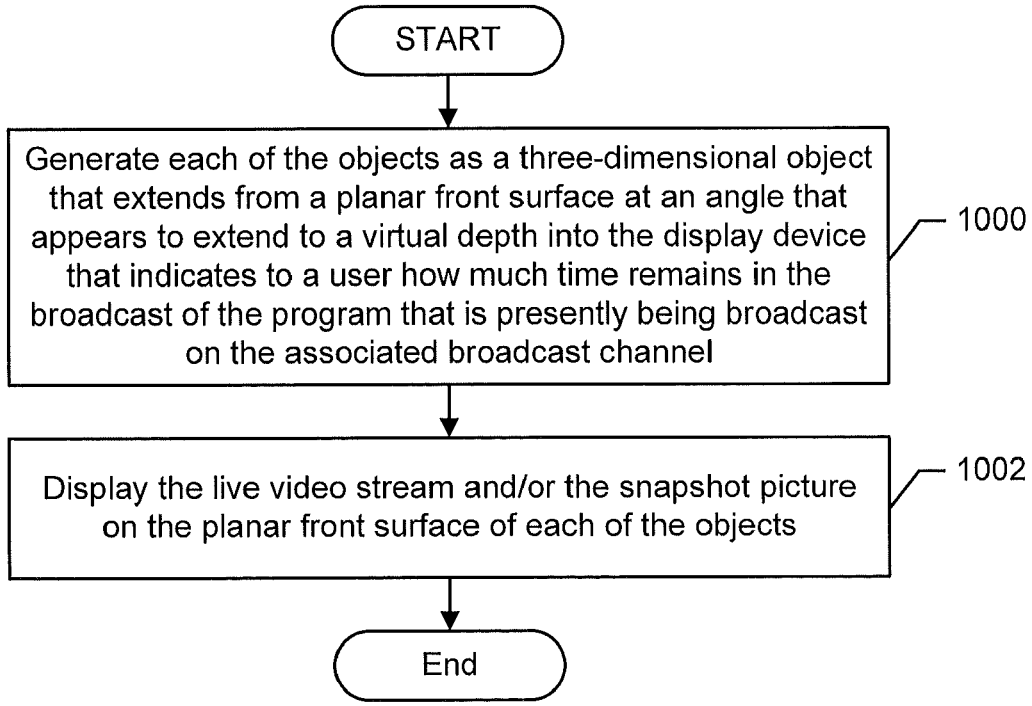

FIG. 10 illustrates further operations and methods that can be performed by the computer in combination with the operations and methods of FIG. 9. Referring to FIG. 10, the computer generates (block 1000) each of the objects as a three-dimensional object (e.g., object 310a of FIG. 3) that extends from a planar front surface at an angle that appears to extend to the virtual depth into the display device 100 that indicates to a user how much time remains in the broadcast of the program that is presently being broadcast on the associated broadcast channel. The computer further displays (block 1002) on the defined surface of each of the objects the live video stream and/or the snapshot picture from the program comprises displaying the live video stream and/or the snapshot picture on the planar front surface of each of the objects.

Figure 11:
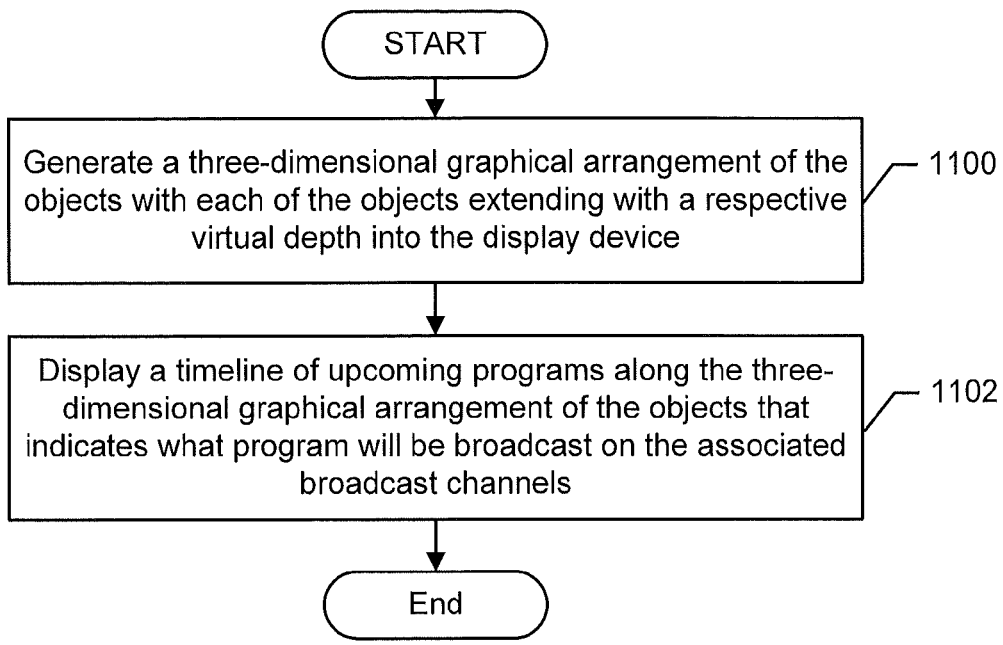

FIG. 11 illustrates further operations and methods that can be performed by the computer in the electronic terminal 402. Referring to FIG. 11, the computer generates (block 1100) a three-dimensional graphical arrangement of the objects (e.g., three-dimensional objects 310 of FIG. 3) with each of the objects being viewable by a user and extending with a respective virtual depth into the display device 100. The computer displays (block 1102) a timeline (e.g., timeline 301 of FIG. 3) of upcoming programs along the three-dimensional graphical arrangement of the objects that indicates what program will be broadcast at what time on the associated broadcast channels.

Figure 12:
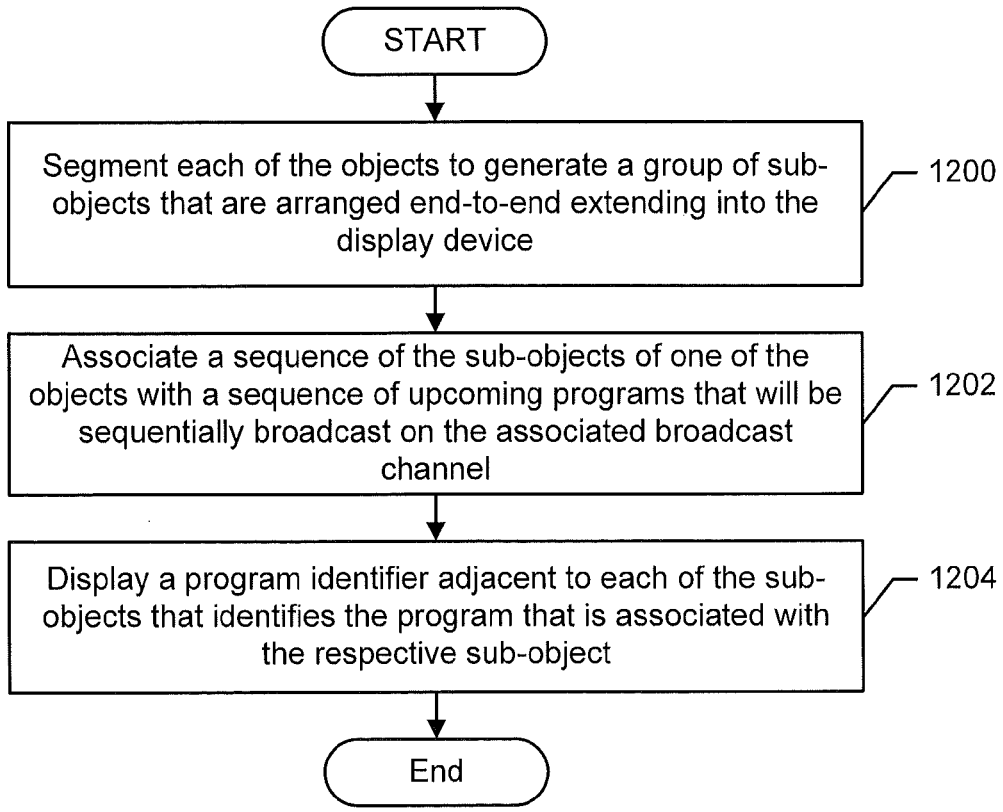

FIG. 12 illustrates further operations and methods that can be performed by the computer in combination with operations and methods of FIG. 11 to generate the three-dimensional graphical arrangement of the objects. Referring to FIG. 12, each of the objects is segmented (block 1200) to generate a group of sub-objects (e.g., objects 310a, 310b, 310c, 310d of FIG. 3) that are arranged end-to-end extending into the display device 100. A sequence of the sub-objects of one of the objects (e.g., objects 310a, 310b, 310c, 310d of FIG. 3) is associated (block 1202) with a sequence of upcoming programs (e.g., program ID1, program ID2, program ID3, program ID4 of FIG. 3) that will be sequentially broadcast on the associated broadcast channel. A program identifier is displayed (block 1204) adjacent to each of the sub-objects that identifies the program that is associated with the respective sub-object.

Figure 13:
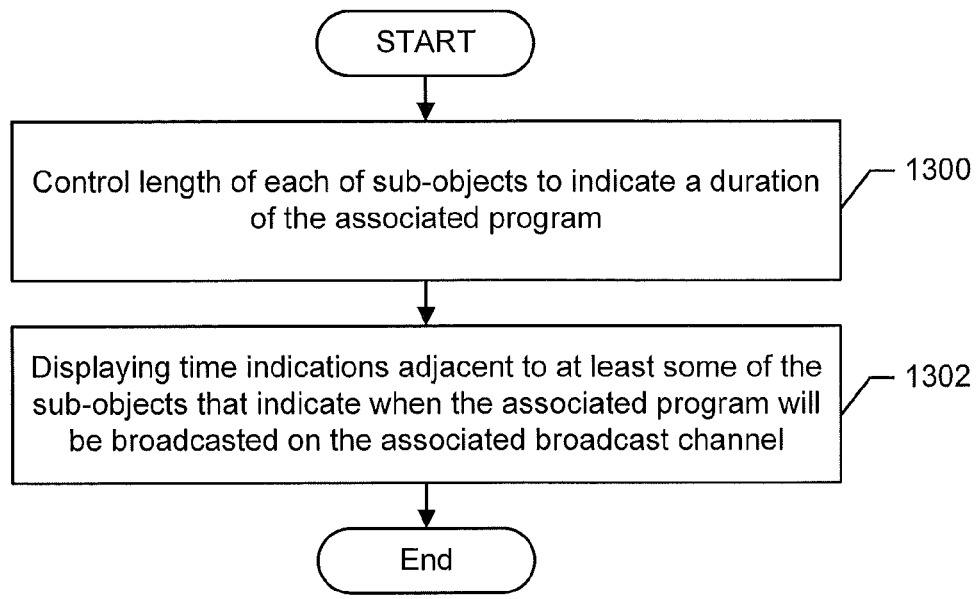

FIG. 13 illustrates further operations and methods that can be performed by the computer in combination with operations and methods of FIG. 12. Referring to FIG. 13, a length of each of sub-objects (e.g., objects 310a, 310b, 310c, 310d of FIG. 3) is controlled (block 1300) to indicate a duration of the associated program (e.g., program ID1, program ID2, program ID3, program ID4 of FIG. 3). Time indications can be displayed (block 1302) adjacent to at least some of the sub-objects that indicate when the associated program will be broadcasted on the associated broadcast channel.

Figure 14:
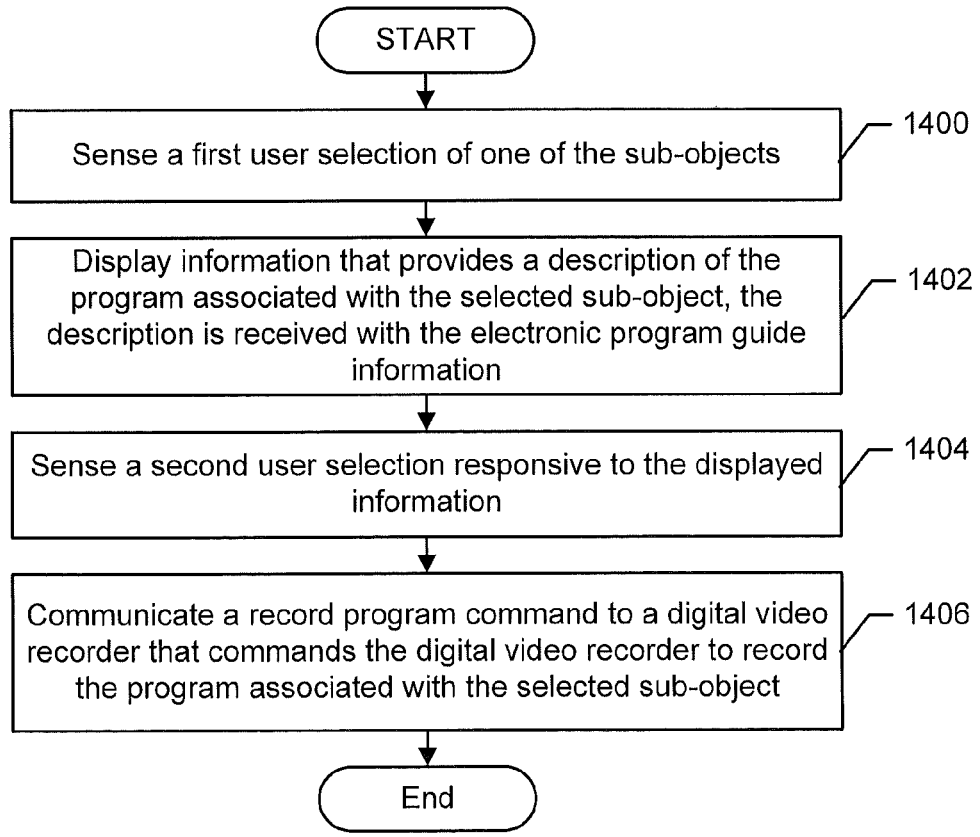

FIG. 14 illustrates further operations and methods that can be performed by the computer in combination with operations and methods of FIG. 12. Referring to FIG. 14, a first user selection of one of the sub-objects is sensed (block 1400), such as by sensing a user touch selections on the display device 100 and/or via another user interface of the electronic device. The computer responds to the first user selection by displaying (block 1402) information that provides a description of the program associated with the selected sub-object. The description is received with the electronic program guide information from one or more of the media servers 450. A second user selection is sensed (block 1404) responsive to the displayed information, such as by sensing a user touch selection on the display device 100 of the displayed information. The computer responds to the second user selection by communicating (block 1406) a record program command to a digital video recorder that commands the digital video recorder to record the program associated with the selected sub-object. The digital video recorder may reside, for example, within each of the electronic terminal 402a, 402b, 402c or it may be a separate device that is connected by a wireless/wired interface to one or more of the electronic terminals 402a, 402b, 402c.

Figure 15:
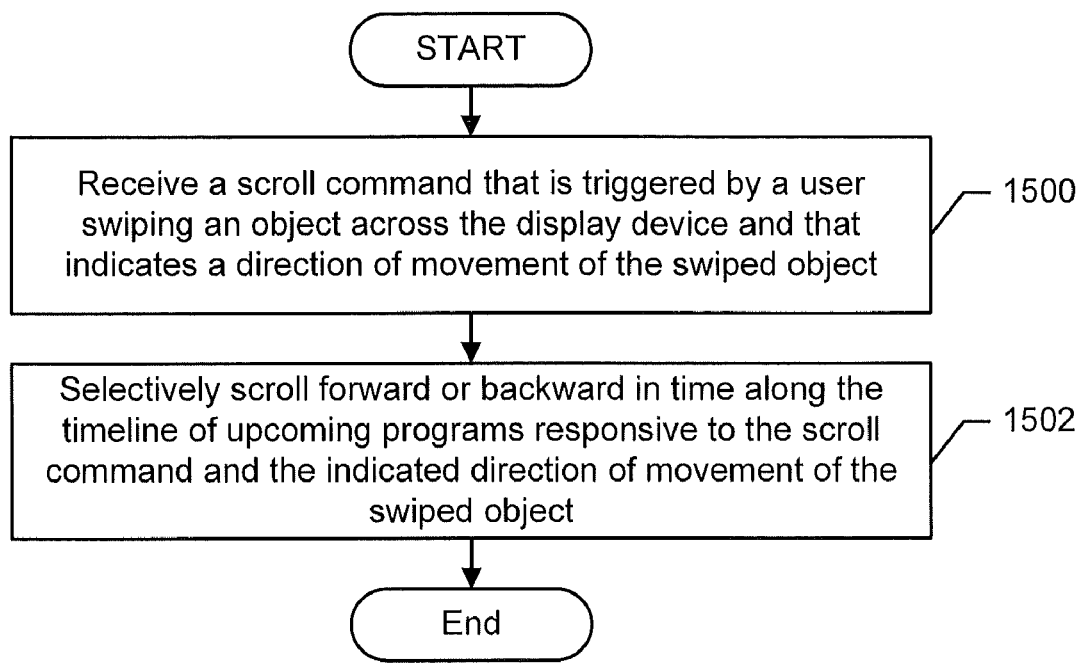

FIG. 15 illustrates further operations and methods that can be performed by the computer in combination with operations and methods of FIG. 12. Referring to FIG. 15, the computer receives (block 1500) a scroll command that is triggered by a user swiping an object across the display device 100 and that indicates a direction of movement of the swiped object. In response to the scroll command, the computer selectively scrolls (block 1502) forward or backward in time along the timeline of upcoming programs responsive to the scroll command and the indicated direction of movement of the swiped object. By way of example regarding FIG. 3, a user may swipe a finger upward/downward on the display 100 to scroll forward/backward in time. When scrolling forward in time, the objects 310 associated with subsequent programs are moved toward a front of the arrangement, and the picture/video thumbnails 300 are changed to correspond to subsequent programs in the sequence as the timeline is advanced to the start time of the associated programs. Similarly, when scrolling backward in time, the objects 310a associated with presently broadcast programs are moved into the arrangement, and the picture/video thumbnails 300 may be changed to correspond to the subsequently broadcast programs as the timeline is reversed to the start time of the associated programs.

Figure 16:
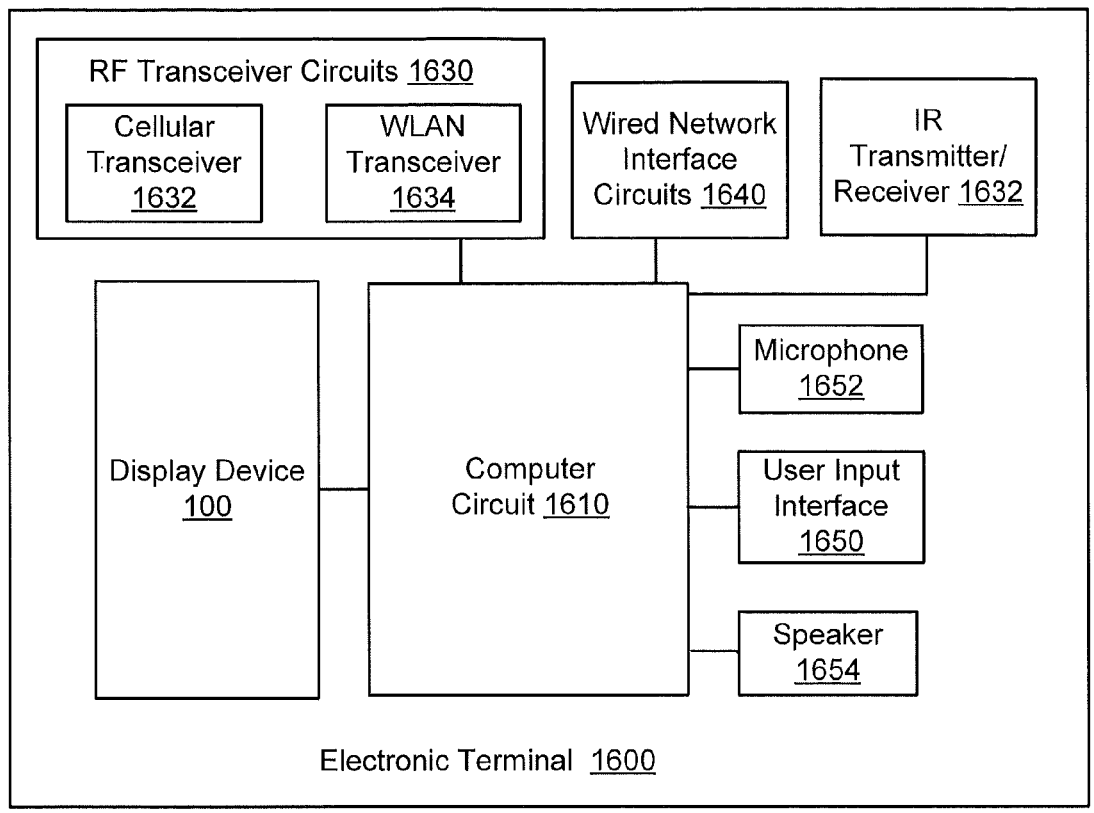
FIG. 16 is a block diagram of an example electronic terminal that is configured according to some embodiments of the present invention.

FIG. 16 is a block diagram of an example electronic terminal 1600 that is configured according to some embodiments of the present invention. The electronic terminal 1600 may correspond to one or more of the terminals 402a, 402b, 402c of FIG. 4. The electronic terminal 1600 can include a computer circuit 1610, a display device 1620 (which may correspond to the display device 100 of FIGS. 2-4), and communication circuits, such as RF transceiver circuits 1630, wired network interface circuits 1640 (e.g., digital cable and/or digital subscriber line interface circuits), and/or infrared (IR) transmitter/receiver circuitry 1632. The RF transceiver circuits 1630 may include a cellular transceiver 1632 and/or a WLAN transceiver 1634 (i.e., IEEE 802.11). The cellular transceiver 1632 may operate according to a cellular radio access technology that may include, but is not limited to, GSM, GPRS, EDGE, DCS, PDC, PCS, CDMA, wideband-CDMA, CDMA2000, UMTS, and/or 3GPP LTE.

The RF transceiver circuits 1630 may be configured to receive a plurality of media streams from one or more of the media servers 450 via the network(s) 430 and the RAN 410 shown in FIG. 4. The wired network interface circuits 1640 may be configured to receive the media streams from one or more of the media servers 450 directly from the network(s) 430.

The RF transceiver circuit 1630, wired network interface circuits 1640, and/or the IR circuit 1632 may be configured to relay commands from the computer circuit 1610 to another wireless electronic terminal, such as from terminal 402a to terminal 402b or 402c, to control an EPG that is displayed on the other terminal and/or to control what channel(s) is presently being displayed on the other terminal and/or recorded on a digital video recorder device associated with the other terminal. The control commands can be generated by the computer circuit 1610 responsive to user selections in accordance with the operations and methods of one or more of FIGS. 2-15.

The display device 1620 may be configured to display one or more video streams and EPG(s), such as by the methods and operations described above with regard to one or more of FIGS. 2-15. The computer circuit 1610 may include one or more data processing and memory circuits, such as a general purpose and/or special purpose processor (e.g., microprocessor and/or digital signal processor) with on-board and/or separate memory devices. The computer circuit 1610 is configured to execute computer program instructions from a memory device, described below as a computer readable medium, to generate EPGs in accordance with one or more of the embodiments disclosed herein, such as by the methods and operations of one or more of FIGS. 2-15.

The computer circuit 1610 may also be configured to operate using the computer program instructions to selectively record one or more of the programs responsive to user selections among the programs displayed in an EPG on the display device 1620. Accordingly, the electronic terminal 1600 may operate as a digital video recorder device that records programs responsive to user selections in the EPG.

The electronic terminal 1600 may further include a microphone 1652 and a user input interface 1650. The user input interface 1650 may include, but is not limited to, a touch screen interface (e.g., configured to respond to single touches or multiple time overlapping touches) associated with the display device 1620, a keypad, a keyboard, buttons, joystick, or other apparatus configured to provide user input commands to the computer circuit 1610 to control the EPG that is displayed on the display device 1620. The terminal 1600 may further include a speaker 1654 that can be configured to output any audio portion of one or more of the programs that are selectable via the EPG.

Figure 17:
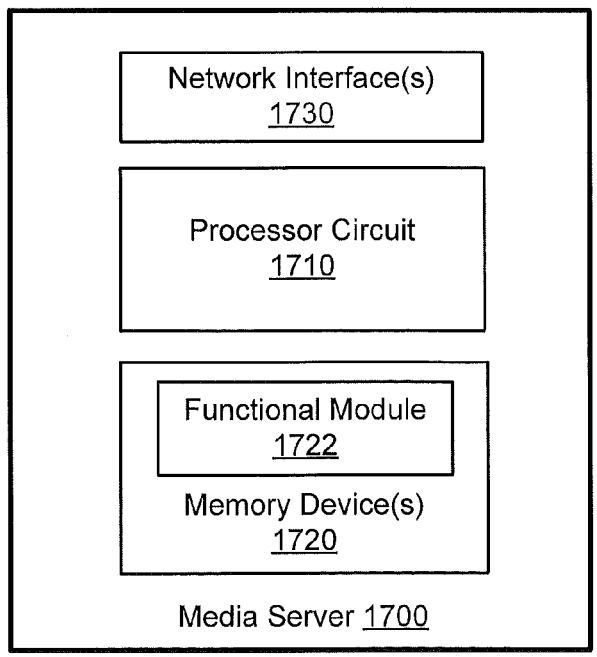
FIG. 17 is a block diagram of a media server that is configured according to some embodiments of the present invention.

FIG. 17 is a block diagram of a media server 1700, which may correspond to one or more of the media servers 450 of FIG. 4, that is configured according to some embodiments of the present invention. The media server 1700 includes a processor circuit 1710, a memory device(s) 1720, and a network interface(s) 1730. The processor circuit 1710 may include one or more data processing and memory circuits, such as a general purpose and/or special purpose processor (e.g., microprocessor and/or digital signal processor) with on-board and/or separate memory devices. The processor circuit 1710 is configured to execute computer program instructions in functional modules 1722 contained in the memory device(s) 1720, described below as a computer readable medium, to generate broadcast programs/stream video to electronic terminals (e.g., terminals 402a, 402b, 402c of FIG. 4 and/or 1600 of FIG. 16) in accordance with one or more of the embodiments disclosed herein, such as by the methods and operations of one or more of FIGS. 2-15.

The processor circuit 1710 of the media server 1700 is configured to communicate electronic program guide information to an electronic terminal. The media server includes at least one communication interface and a processor circuit. The processor circuit is configured to determine a schedule of programs that are presently being broadcast over a plurality of broadcast channels and that will be broadcast over a defined period of time. The processor circuit is further configured to generate a live video stream and/or a snapshot picture from each of a plurality of the programs that are presently being broadcast on the broadcast channels, where the live video stream has a reduced frame size and/or the snapshot picture has a reduced resolution relative to the programs. The processor circuit generates electronic program guide information that includes the determined schedule of programs and the generated live video streams and/or snapshot pictures for the programs that are presently being broadcast on the broadcast channels. The processor circuit communicates the electronic program guide information through the communication interface to the electronic terminal. The media server 1700 can perform other operations described above for one or more of the media servers 450 of FIG. 4.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of methods (e.g., computer-implemented methods), apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of operating an electronic terminal to generate an electronic program guide for broadcast channels on a display device of the electronic terminal, the method comprising:

receiving, at the electronic terminal from a broadcast media server, electronic program guide information for a plurality of broadcast channels, the electronic program guide information including live video streams and/or snapshot pictures from programs that are presently being broadcast on a plurality of broadcast channels;

generating, by operation of a computer circuit of the electronic terminal, a graphical arrangement on the display device of a plurality of objects, wherein each of the objects is associated with a different one of the broadcast channels, wherein the generating the graphical arrangement comprises generating a three-dimensional graphical arrangement of the objects with each of the objects being viewable by a user and extending with a respective virtual depth into the display device that is controlled to indicate to a user how much time remains in the program that is presently being broadcast on the associated broadcast channel; and displaying, by operation of the computer circuit, on a defined surface of at least some of the objects the live video stream and/or the snapshot picture from the program that is presently being broadcast on the associated broadcast channel.

2. The method of claim 1, further comprising:
sensing a user selection of one of the objects; and
responding to the user selection by communicating a channel selection command from the electronic terminal to a separate television that commands the television to tune to the broadcast channel associated with the selected object.

3. The method of claim 1, further comprising:
sensing a user selection of one of the objects; and
toggling from displaying on the defined surface of the selected object a snapshot picture from a program that is presently being broadcast on the associated broadcast channel to displaying on the defined surface of the selected object the live video stream from the program that is presently being broadcast on the associated broadcast channel.

4. The method of claim 1, further comprising:
receiving a scroll command that is triggered by a user swiping an object across the display device and that indicates a direction of movement of the swiped object;
generating new associations between the objects and the broadcast channels that shift, in a direction determined responsive to the scroll command and the indicated direction of movement of the swiped object, which of the objects are associated with which of the broadcast channels; and
displaying on the defined surface of the at least some of the objects the live video stream and/or the snapshot picture from the program that is presently being broadcast on the newly associated broadcast channel.

5. The method of claim 1, wherein:
generating the three-dimensional graphical arrangement of the objects comprises generating each of the objects as a three-dimensional object that extends from a planar front surface at an angle that appears to extend to the virtual depth into the display device that indicates to a user how much time remains in the broadcast of the program that is presently being broadcast on the associated broadcast channel; and
displaying on the defined surface of the at least some of the objects the live video stream and/or the snapshot picture from the program comprises displaying the live video stream and/or the snapshot picture on the planar front surface of the at least some of the objects.

6. The method of claim 5, wherein generating the three-dimensional graphical arrangement of the objects comprises:
generating each of the objects as a rectangular box that extends to the virtual depth into the display device that indicates to a user how much time remains in the broadcast of the program that is presently being broadcast on the associated broadcast channel; and
arranging the rectangular boxes horizontally across the display device.

7. A method of operating an electronic terminal to generate an electronic program guide for broadcast channels on a display device of the electronic terminal, the method comprising:
receiving, electronic terminal from a broadcast media server, electronic program guide information for a plurality of broadcast channels, the electronic program guide information including live video streams and/or snapshot pictures from programs that are presently being broadcast on a plurality of broadcast channels;
generating, by operation of a computer circuit of the electronic terminal, a graphical arrangement on the display device of a plurality of objects, wherein each of the objects is associated with a different one of the broadcast channels, wherein the generating the graphical arrangement comprises generating a three-dimensional graphical arrangement of the objects with each of the objects being viewable by a user and extending with a respective virtual depth into the display device that is controlled to indicate to a user a duration of the associated program; and
displaying a timeline of upcoming programs along the three-dimensional graphical arrangement of the objects that indicates what program will be broadcast at what time on the associated broadcast channels.

8. The method of claim 7, wherein:
generating a three-dimensional graphical arrangement of the objects comprises:
segmenting each of the objects to generate a group of sub-objects that are arranged end-to-end extending into the display device;
associating a sequence of the sub-objects of one of the objects with a sequence of upcoming programs that will be sequentially broadcast on the associated broadcast channel; and
displaying the timeline of upcoming programs along the three-dimensional graphical arrangement of the objects comprises displaying a program identifier adjacent to each of the sub-objects that identifies the program that is associated with the respective sub-object.

9. The method of claim 8, further comprising:
displaying time indications adjacent to at least some of the sub-objects that indicate when the associated program will be broadcasted on the associated broadcast channel.

10. The method of claim 8, further comprising:
sensing a first user selection of one of the sub-objects;
responding to the first user selection by displaying information that provides a description of the program associated with the selected sub-object, wherein the description is received with the electronic program guide information;
sensing a second user selection responsive to the displayed information; and
responding to the second user selection by communicating a record program command to a digital video recorder that commands the digital video recorder to record the program associated with the selected sub-object.

11. The method of claim 8, further comprising:
receiving a scroll command that is triggered by a user swiping an object across the display device and that indicates a direction of movement of the swiped object; and
selectively scrolling forward or backward in time along the timeline of upcoming programs responsive to the scroll command and the indicated direction of movement of the swiped object.

12. An electronic terminal that generates an electronic program guide for broadcast channels, the electronic terminal comprises:
at least one communication interface that receives from a broadcast media server electronic program guide information for a plurality of broadcast channels, the electronic program guide information including live video streams and/or snapshot pictures from programs that are presently being broadcast on a plurality of broadcast channels;
a display device; and a processor circuit that is configured to:
    generate a graphical arrangement on the display device of a plurality of objects, wherein each of the objects is associated with a different one of the broadcast channels, and further configured to generate the graphical arrangement as a three-dimensional graphical arrangement of the objects with each of the objects being viewable by a user and extending with a respective virtual depth into the display device that is controlled to indicate to a user how much time remains in the program that is presently being broadcast on the associated broadcast channel; and
    display on a defined surface of at least some of the objects the live video stream and/or the snapshot picture from the program that is presently being broadcast on the associated broadcast channel.

13. The electronic terminal of claim 12, wherein the processor circuit is further configured to:
    respond to a signaling indicating a user selection of one of the objects by communicating a channel selection command to a separate television through the at least one communication interface that commands the television to tune to the broadcast channel associated with the selected object.

14. The electronic terminal of claim 12, wherein the processor circuit is further configured to:
    receive a scroll command from the display device that is triggered by a user swiping an object across the display device and that indicates a direction of movement of the swiped object;
    generate new associations between the objects and the broadcast channels that shift, in a direction determined responsive to the scroll command and the indicated direction of movement of the swiped object, which of the objects are associated with which of the broadcast channels; and
    display on the defined surface of the at least some of the objects the live video stream and/or the snapshot picture from the program that is presently being broadcast on the newly associated broadcast channel.

15. The electronic terminal of claim 12, wherein the processor circuit is further configured to:
    generate a three-dimensional graphical arrangement of the objects with each of the objects being viewable by a user and extending with a respective virtual depth into the display device by:
        segmenting each of the objects to generate a group of sub-objects that are arranged end-to-end extending into the display device;
        associating a sequence of the sub-objects of one of the objects with a sequence of upcoming programs that will be sequentially broadcast on the associated broadcast channel; and
        controlling a length of each of sub-objects to indicate a duration of the associated program; and
    display a timeline of upcoming programs along the three-dimensional graphical arrangement of the objects that indicates what program will be broadcast on the associated broadcast channels by displaying a program identifier adjacent to each of the sub-objects that identifies the program that is associated with the respective sub-object.

16. The electronic terminal of claim 15, wherein the processor circuit is further configured to:
    receive a scroll command that is triggered by a user swiping an object across the display device and that indicates a direction of movement of the swiped object; and
    selectively scroll forward or backward in time along the timeline of upcoming programs responsive to the scroll command and the indicated direction of movement of the swiped object.

* * * * *

UNITED STATES PATENT AND TRADEMARK OFFICE
CERTIFICATE OF CORRECTION

PATENT NO. : 8,381,246 B2
APPLICATION NO. : 12/973569
DATED : February 19, 2013
INVENTOR(S) : Skog et al.

Page 1 of 1

It is certified that error appears in the above-identified patent and that said Letters Patent is hereby corrected as shown below:

In the Specification

In Column 1, Line 15, delete "(EPG)" and insert -- (EPGs) --, therefor.

In the Claims

In Column 15, Line 62, in Claim 7, delete "electronic" and insert -- at the electronic --, therefor.

Signed and Sealed this
Thirteenth Day of August, 2013

Teresa Stanek Rea
*Acting Director of the United States Patent and Trademark Office*